Patented Apr. 21, 1942

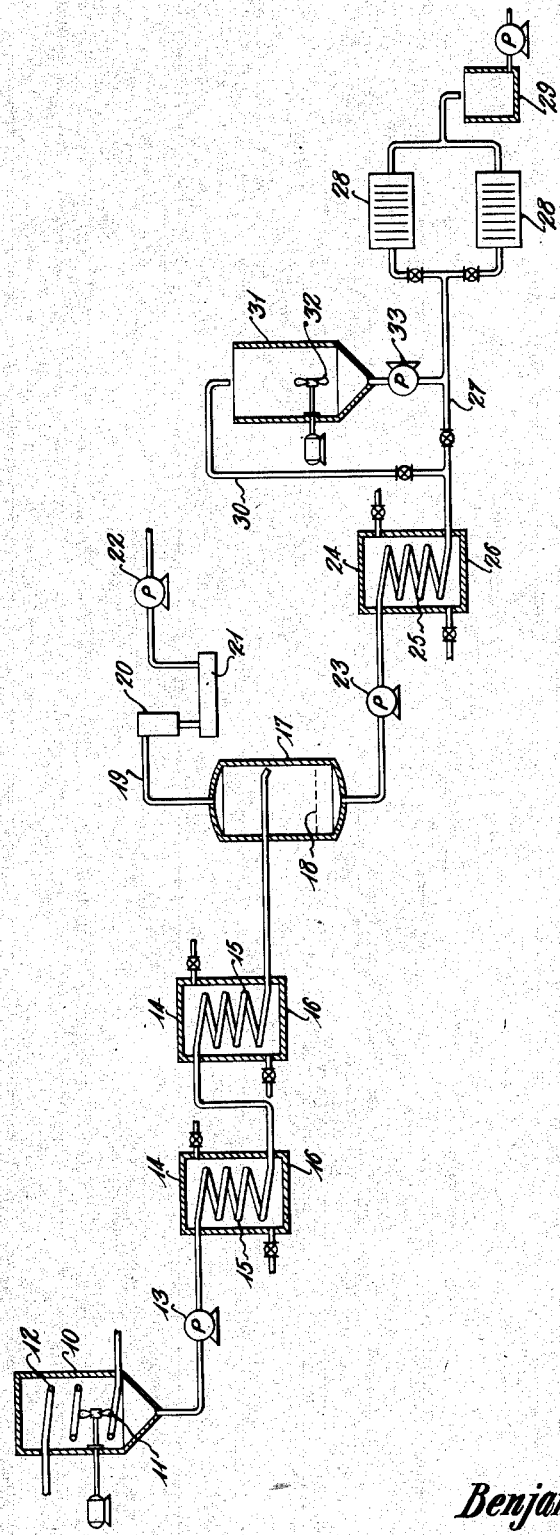

2,280,427

UNITED STATES PATENT OFFICE 2,280,427

PHOSPHATIDIC COMPOSITION

Benjamin H. Thurman, Bronxville, N. Y., assignor to Refining, Inc., Reno, Nev., a corporation of Nevada Application January 9, 1940, Serial No. 313,131

9 Claims. (Cl. 99—123)

This invention relates to phosphatidic compositions, and more particularly to compositions of phosphatidic material with glyceride oils and fats and a process of incorporating phosphatidic material into such oils or fats.

Phosphatides and modifications thereof, when incorporated in small amounts into shortening, impart certain desirable characteristics thereto, one of the most important being an increase of the sugar tolerance in baked products such as cakes. The desirability of increasing the sugar-to-flour ratio in order to improve the taste of cakes has long been known. It was further known that, with conventional triglyceride shortenings, the employment of a ratio of sugar to flour much above 1 to 1 results in a cake of small volume and poor texture. The incorporation of a small amount of phosphatidic material in a cake batter enables much higher ratios of sugar to flour to be used, while at the same time producing a cake of large volume and excellent texture, which has good keeping qualities because of its improved moisture retention properties. In fact, the employment of phosphatides per se, such as soya bean phosphatides may reduce the surface tension of the cake batter to such an extent that the cake may develop too great a volume during baking and fall when cooled. That is to say, the proportions of phosphatides from a given cake formula are extremely critical. The phosphatidic compositions such as the neutral or acidic compounds of phosphatides with alkali metal phosphates or with alkali metal salts of edible water soluble hydroxy acids disclosed in my copending applications, hereinafter referred to, eliminate this difficulty.

The most satisfactory way of incorporating the phosphatidic material into a cake batter is to mix the same with the shortening. Because of the small amount of phosphatidic material employed and the necessity of controlling the ratio of phosphatidic material to shortening in order to secure uniform results in baking, it is desirable that the phosphatidic material be added to the shortening by the shortening manufacturer, thereby producing what is known as a high ratio shortening. For baking purposes, the mere mixing with phosphatidic material of the shortening is sufficient. This is particularly true with the phosphatidic compounds referred to above, as shortenings containing the same are suitable for substantially all baking purposes. Shortenings are sold, however, for general use, and are used for other purposes, such as frying. It has been found that shortenings which have been merely admixed with phosphatides or phosphatidic compounds are unsuitable, and in fact dangerous, for certain other uses, particularly deep fat frying. When a body of such shortening is heated to frying temperatures, the heated materials foam violently and constitute a fire hazard, as the material may overflow from the container and become ignited.

The phosphatidic material also performs another valuable function in shortenings. The presence of the phosphatidic material, particularly phosphatides which are free from acid radicals of greater unsaturation than linoleic, for example corn and cotton phosphatides, improves the keeping quality of the shortening by acting as an antioxidant and also as an antireversion agent in shortenings containing soya bean or similar reverting oils. The important property of improving keeping qualities is also of value in edible oils or fats other than shortenings, for example cooking oils such as liquid corn oil, extensively employed as salad oils and for deep fat frying. Prior to the present invention it has been dangerous to incorporate phosphatides into cooking oils sold for general purposes because of the foaming characteristics above referred to. However, the present invention is applicable to any glyceride oil or fat so as to impart high keeping qualities thereto while avoiding the production of dangerous amounts of foaming.

In accordance with the present invention, I have discovered that phosphatidic materials such as phosphatides and phosphatidic compounds may be added to shortenings or other cooking fats or oils and the resulting mixture heat treated to destroy its foaming characteristics, or a treated concentrate free from foaming properties may be prepared and mixed with fats or oils to accomplish the same result. The resulting composition retains all of the desirable characteristics of a mixture with phosphatidic material, although it is known that the chemical composition of the phosphatidic material is modified during the treating step.

It is, therefore, an object of the present invention to provide a non-foaming glyceride oil or fat containing phosphatidic material.

Another object of the invention is to provide a glyceride cooking fat or oil containing phosphatidic material so as to have improved keeping qualities and which will not foam when heated.

Another object of the invention is to provide a high ratio shortening containing phosphatidic material which has been treated to prevent foaming of the shortening.

Another object of the invention is to provide a process of incorporating phosphatidic material into cooking oils or fats so as to impart improved keeping qualities thereto while producing a product which will not foam when heated.

Another object of the invention is to provide a process of incorporating phosphatidic material into shortenings to produce a non-foaming shortening.

A further object of the invention is to provide a process of incorporating phosphatidic material into cooking oils or fats in which the phosphatidic material is heat treated to reduce the foaming characteristics thereof.

A still further object of the invention is to provide a process of continuously treating phosphatidic material in order to enable the incorporation thereof into cooking fats or oils to produce non-foaming products having improved keeping qualities and shortenings of the high ratio type.

The preferred phosphatidic materials for incorporation into shortenings or other cooking oils or fats in accordance with the present invention are corn phosphatides recovered from crude corn oil, for example, as disclosed in my Patent No. 2,150,732, granted March 14, 1939, although various other phosphatides and phosphatidic compositions, particularly the sodium lactate-corn phosphatide composition disclosed in my copending application Serial No. 311,707, filed December 29, 1939, may be similarly employed. Such a composition may be prepared by mixing sodium lactate with corn oil phosphatides, heating in the presence of water, evaporating to dryness, separating the resulting compound with a solvent thereof and evaporating the solvent. The corn phosphatides and the sodium lactate-corn phosphatide composition are preferred, as they are light in color, are not discolored by modification thereof in the process of the present invention, and do not affect the taste of the shortening or other products in which they are used. Approximately 2% of either the corn phosphatide or sodium lactate-corn phosphatide composition gives optimum results, although the amount may vary from approximately 1.5 to 5%. As stated above, edible fats or oils with which this material has merely been mixed will foam violently when a body thereof is heated, for example for deep fat frying. I have found that by heating the fat or oil admixed with a phosphatidic material to relatively high temperatures under controlled conditions until foaming ceases, and then filtering the same with the aid of an adsorbent such as activated charcoal, fuller's earth, activated clay, etc., the material retains its improved keeping qualities, and in the case of a shortening, retains its desirable high ratio characteristics, but has lost its foaming characteristics. The phosphatidic material is preferably also heated in the presence of an adsorbent. It is known that the composition of the phosphatidic material is changed by the heating and that products antagonistic to the high ratio characteristics are formed during the heating. Mere filtering of the heated product does not remove the antagonistic materials mentioned, but filtering in the presence of an adsorbent does remove these materials so that the shortening again acquires its high ratio characteristics. Although the adsorbent is preferably present in the fat or oil during heating, it may be added after heating. The heating referred to is preferably carried on in the absence of air, that is, in an atmosphere of inert gas or steam or in a closed heating system such as a heating coil. The modification of the phosphatidic material to destroy the foaming characteristics appears to be a function of time and temperature. That is to say, the lower the temperature of treatment the longer the time of heating required. Certain of the adsorbents, for example, acid treated clay, appear to act as a catalyst to increase the rate of modification of the phosphatidic material and decrease the time of heating required. The heating is carried on until foaming ceases, but continued heating for an extended time after the cessation of foaming is undesirable, as such continued heating reduces the high ratio characteristics of shortening and the protective action of the phosphatidic material against rancidity or reversion. The phosphatidic material so produced and retained in the fat or oil is considered to be a modified phosphatidic material.

It has also been found that a concentrate may be prepared by heating a mixture of oil or fat containing a relatively large amount of phosphatidic material and treating the same with an adsorbent, and that the resulting concentrate can be added to shortening to produce a non-foaming high ratio shortening, or to any glyceride oil or fat to improve its keeping qualities without imparting foaming properties thereto. Thus, the phosphatidic material may be admixed with a lesser amount of oil or fat; for example, a mixture containing between 20 and 80% of phosphatidic material may be prepared, and this mixture heat treated and added to the main body of the shortening in proportions corresponding to, for example, 2% of the original phosphatidic material. Continued heating after the foaming characteristics have been destroyed reduces the high ratio and high keeping characteristics of the material. As it is difficult to quickly change temperatures in a batch process, it is preferred to prepare the treated concentrate in a continuous process. Also, a continuous process eliminates difficulties due to foaming in a large batch of material.

The attached drawing illustrates an apparatus capable of carrying out a continuous process of treating the materials of the present invention to prevent foaming. In the drawing, 10 indicates a mixing receptacle in which the oil and phosphatidic material may be mixed by an agitator 11. The mixing receptacle is preferably provided with a heating coil 12 to maintain the mixture in a flowable condition. The mixture of oil or fat and phosphatidic material may be pumped from the receptacle 10 by means of a pump 13 and delivered through one or more heating devices 14 which preferably comprises a heating coil 15 positioned in a casing 16 through which any desired heating medium such as heated mineral oil may be passed. The agitator in tank 11 is preferably continued in motion during withdrawal of the mixture in order to provide a substantially uniform mixture. It is apparent that two or more mixing receptacles 10 may be provided and employed alternately so that the mixture may be pumped from one receptacle while the mixture is being prepared in another receptacle, thus rendering the process entirely continuous. The mixture is heated in the heating devices 14 to the temperature found necessary with a particular mixture to destroy the foaming characteristics thereof when added to shortening. The temperature will depend upon the mixture being treated, and will usually fall between 300° and 450° F., although in some instances temperatures as low as 250° F. may be found suitable, while with others temperatures as high as 500° F. may be necessary. Desirably, the lowest temperature which will destroy the foaming characteristics is employed, and this temperature is usually found to be in the neighborhood of 385° F.

In order to release the foam caused by heating in the heating device 14, it is preferred to discharge the heated material into a vapor separating zone 17 above the level 18 of the material therein. A relatively high vacuum, for example, a vacuum ranging from 29 to 30 inches of mercury, is preferably maintained in the vapor separating chamber 17, and for this purpose vapors may be withdrawn through a pipe 19 and delivered to a condenser 20 provided with a receiver 21 to which a vacuum pump 22 is connected. Lower vacuums may be employed or even atmospheric pressure in the vapor separating chamber 17, but the higher vacuums more quickly break any foam which tends to form in the chamber 17. At the high temperatures required, air should be prevented from coming in contact with the mixture even if atmospheric pressures are employed. Preferably the mixture is discharged against a wall of the chamber 17 so that the same flows as a film down the wall to aid in liberation of vapors and gases. The heated material may be withdrawn from the vapor separating zone by a pump 23, and passed through a cooling device 24 which may contain a coil 25 positioned in a casing 26 through which any desired cooling medium, such as water, may be passed. The temperature of the mixture is lowered in the cooling device 24 to a temperature at which the material will not be damaged by the air. This temperature will ordinarily be lower than 200° F. The temperature of the material, however, is ordinarily retained high enough so that it remains flowable so as to provide for ease in filtering. If the adsorbent employed in the process has been also added to the mixture in the mixing receptacle 10, the cooled material may be delivered directly through a pipe 27 to one or more filter presses 28 which may be arranged for alternate use. The filtered material may be delivered into a receiver 29 from which it may be removed either continuously or intermittently for addition to shortening.

The time of heat treatment necessary to destroy the foaming characteristics of the phosphatidic material is dependent upon the temperature, the nature of the phosphatidic material, and, if an adsorbent is present during heating, the nature of the adsorbent. Thus, for the higher temperatures, heat treating periods as short as 2 to 5 minutes may be sufficient, while at the lower temperatures periods as great as 1 to 4 hours may be necessary. The requisite time may be obtained by varying the number or length of the heating devices 14 or the rate of flow therethrough, or by providing a vapor separating chamber 17 of relatively large size, retaining the materials in the vapor separating chamber at the required temperature until the foaming characteristics are destroyed. If the materials are retained in the vapor separating zone, it is advantageous to pass superheated steam therethrough to assist in carrying off vaporizable materials and odors. Alternatively, the heated materials from one or more heating devices 14 may be discharged into an enlarged chamber and held under pressure for the requisite time and then discharged into the vapor separating zone and immediately withdrawn therefrom, or the materials may be retained in such an enlarged chamber for a portion of the requisite time and the remaining time of high temperature treatment obtained in the vapor separating zone.

In the preferred process, the adsorbent is added in the original mixing device 10, but it is entirely possible to deliver the cooled material from the cooling device 24 through a pipe 30 into a mixing receptacle 31 provided with an agitator 32. The adsorbent may be mixed with the material in the mixer 31 and then delivered by a pump 33 to the filter presses 28.

The adsorbent employed in the process may be activated charcoal such as "Nuchar," fuller's earth, activated clay such as "Filtrol," activated magnesium silicate, activated alumina, kieselguhr, etc. The amount of adsorbent required will vary with the type of adsorbent and the type of material being treated, but will usually range between .1% and 5% and will ordinarily be in the neighborhood of 1% of the phosphatidic material in the mixture, although, when mixtures containing only a small amount of phosphatidic material are treated, the percentage of adsorbent relative to the phosphatidic material will usually be greater. Sufficient adsorbent should be used to remove the materials antagonistic to high ratio characteristics in the case of shortening. The concentrate resulting from the process above described can be merely admixed with the shortening or other cooking fat or oil, but is preferably added thereto during the process of deodorizing the fat or oil. The fat or oil employed to make up the concentrate is preferably of the same consistency as the product to which it is to be added, and may, for example, be a portion of the fat or oil to which it is to be added. Since an edible fat or oil is usually treated in a deodorizer under vacuum at relatively high temperatures for a considerable length of time while steam is passed therethrough, it is preferred to add the modified phosphatidic concentrate to the deodorizer some time before the oil is removed from the deodorizer. Extended heating of the fat or oil containing the phosphatidic material in the deodorizer beyond that required to complete the reaction necessary for destroying the foaming characteristics of the phosphatidic material will reduce its keeping qualities or high ratio characteristics. If the oil or fat is to be treated with an adsorbent after deodorizing, the adsorbent treatment of the concentrate may be omitted in the process of preparation thereof.

It is apparent that the modification of the phosphatidic material to destroy its foaming characteristics can be accomplished during deodorizing of the fat or oil by mixing the phosphatidic material therewith prior to or during deodorizing. Such process may be carried out as part of the usual step of deodorizing. The phosphatidic material is preferably added to the mass of oil or fat in the conventional deodorizer after deodorizing is partially complete, as the usual time of deodorizing at the usual temperature of approximately 375° F. is greater than desirable. A convenient way of adding the phosphatidic material is to mix the same with a previously deodorized or partially deodorized oil or fat to form a flowable mixture, for example a mixture containing 20 to 50% phosphatidic material, and then draw a small stream of the mixture into the heated oil or fat in the deodorizer until the required amount of phosphatidic material has been incorporated. By this procedure the production of large amounts of foam is avoided. With corn phosphatides, it has been found that a time of treatment in the deodorizer of approximately 1 hour and 35 minutes at 375° F. destroyed the foaming characteristics while giving excellent high ratio and high keeping characteristics after filtering with an adsorbent. It has also been found that the time of treatment may be as long as approximately 2½ hours without substantially reducing high ratio and high keeping characteristics, but continued time of treatment thereafter rapidly reduced these characteristics. Thus, the corn phosphatides should be introduced into the deodorizer at the temperature referred to at least an hour and thirty-five minutes before any oil or fat is withdrawn therefrom and all of the oil or fat should be withdrawn within 2½ hours after the phosphatidic material has been added.

The time of treatment at a given temperature will, however, vary with the nature of the phosphatidic material added. In general, the more acidic the phosphatidic material the shorter the time of treatment. Corn phosphatides are quite acidic, the addition of 2% thereof to neutral oil producing an acidity equivalent to approximately 0.5% free fatty acids. Other vegetable phosphatides such as cottonseed phosphatides are less acidic, and in general the phosphatidic compounds such as the sodium lactate-phosphatide compounds previously referred to are less acidic and require a longer time of treatment at a given temperature. If certain adsorbents such as acid treated clay are present during the heating, a lesser time is required. The heat treatment markedly reduces the acidity of the phosphatidic material. For example, the equivalent free fatty acid content of the mixture with corn phosphatides referred to above is reduced to below 0.25% and usually to 0.15 to 0.17%.

Even with the light colored corn phosphatides referred to and other light colored phosphatidic materials, the oil or fat containing the same darkens in color during the initial portion of the heating step. This is true even when the heating is in the presence of an adsorbent. Filtering of a sample which has not been heated for the requisite time with an adsorbent will not remove the color. It has been found, however, that heating of the materials until foaming characteristics have been destroyed also enables the color to be removed by filtering in the presence of an adsorbent. In certain cases it has been found difficult to carry out large scale filtering operations, as the products formed during the heat treatment tend to form a colloidal slime in the filter press which blocks the filter elements. This difficulty has been overcome by adding a small amount of a powdered anhydrous alkali metal, alkaline earth metal or ammonium salt. Thus, adding approximately 0.5% of dry powdered sodium chloride to the initial mixture of oil or fat and phosphatidic material changes the colloidal slime to a granular filterable mass without otherwise affecting the product. Other salts which may be employed are anhydrous sodium sulfate, sodium bicarbonate, sodium nitrate, potassium sulfate, potassium nitrate, sodium acetate, calcium sulfate, tricalcium phosphate, monosodium hydrogen phosphate, ammonium bicarbonate, ammonium carbonate, ammonium sulfate, etc.

While the processes above described are preferable, it is possible to first mix an oil or fat with a phosphatidic material and perform the heat treating of the present invention as a batch operation. Thus, the phosphatidic material may be added to a batch of shortening or other cooking fat or oil and the entire batch heated to the requisite temperature for destroying its foaming characteristics. This is usually a somewhat difficult operation unless carried on in small batches, as the foam produced may cause overflowing of the container. If the heating is performed in the presence of air, the resulting material is usually darkened and its high ratio characteristics impaired. Heating is therefore preferably carried on under vacuum conditions or in an atmosphere of inert gas such as carbon dioxide or nitrogen. Steam may likewise be employed to blanket the material during heating. Satisfactory high ratio shortenings can be produced by the batch method, particularly if small batches are treated at a time and also considerable quantities of the treated phosphatidic material may be produced in concentrate form in batch operations.

It has been found that there is often a close correlation between high ratio characteristics of shortenings and the interfacial tension between the melted shortening and water. Thus, a shortening product giving an interfacial tension reading on the De Nouy tensiometer at 122° F. much above 6 dynes per centimeter, for example above 7, is usually not satisfactory as a high ratio shortening, and in most instances a satisfactory high ratio shortening will have a tensiometer reading of from 4 to 6 dynes per centimeter. In some instances a lower reading, for example 3 dynes per centimeter, may be satisfactory. It is a characteristic of some of the high ratio shortenings made by the present invention, that they produce high ratio cakes of full volume and excellent texture even with interfacial tensiometer readings of 8 to 10 dynes per centimeter or even higher. This may be caused by the presence of small quantities of products antagonistic to the lowering of the interfacial tension of the shortening.

Another test for satisfactory high ratio shortening is the so-called "emulsion" test, which consists of adding 20 gr. of the melted shortening to 15 gr. of water and rapidly shaking the mixture in a glass bottle at a temperature of approximately 140° F. After shaking for a short time, the mixture abruptly changes in appearance and, for a satisfactory high ratio shortening, discontinuing the shaking will leave a characteristic curdy formation upon the glass above the level of the material which contains no free oil and water droplets. This coating can be described as having somewhat the appearance of hoar frost on a window pane and forms a persistent coating covering the entire surface of the glass above the level of the liquid. If free oil or water droplets are present, the coating breaks or separates upon the surface of the glass, leaving spaces in the coating. The type of oil and water emulsion producing the persistent coating referred to is apparently that necessary for high ratio effects, as there is extremely good correlation between the emulsion test and the high ratio characteristics of the shortening.

The addition of approximately 2% of the sodium lactate-phosphatidic composition above referred to directly to shortening produces a tensiometer reading below 6 dynes per centimeter and a satisfactory emulsion by the emulsion test. Upon heating to break the foam as above described, the tensiometer reading is somewhat increased but a satisfactory emulsion is not formed by the emulsion test. Filtering in the absence of an adsorbent does not substantially affect the tests. However, upon filtering with an adsorbent, the tensiometer reading is again usually increased by a small amount and a satisfactory emulsion test is given.

As a specific example of preparing a concentrate by a batch operation in accordance with the present invention, a mixture was prepared containing 50% of the sodium lactate-corn phosphatide composition and 50% of hydrogenated vegetable shortening. This mixture was heated as rapidly as possible to 475° F. in a flask kept under an atmosphere of carbon dioxide and in the presence of approximately 1% "Nuchar," which is an activated charcoal. The heating was stopped as soon as foaming ceased (approximately 2 hours) and the material was cooled as rapidly as possible and filtered. A clear, light colored concentrate was produced. This concentrate was added to shortening in a deodorizer, after deodorizing thereof was nearly complete, to produce a mixture containing 4% of the concentrate. The resulting shortening was then deodorized at 385° F. for ten minutes and filtered. The shortening gave a good emulsion by the emulsion test above mentioned, and had a tensiometer reading of 6 dynes per centimeter. This mixture did not foam when heated to temperatures of 350 to 425° F., even when foam-producing materials such as potatoes were fried therein.

As a specific example of making a concentrate by a continuous process, 80% of the sodium lactate-corn phosphatide compound and 20% of a hydrogenated vegetable oil shortening were agitated in the mixer 10 of the drawing at a temperature of approximately 140° F. Approximately 1% "Filtrol," which is an acid treated clay, on the basis of the amount of phosphatidic compound was added during agitation. When a thorough mixture was obtained, and while agitation was continued at a rate sufficient to maintain the mixture uniform, a stream of the mixture was pumped from the mixer and passed through the heating coils 15. The time of heating in the heating coils was approximately 5 minutes, and the temperature reached was approximately 385° F. The heated mixture was discharged into the vapor separating chamber 17 at this temperature, and a vacuum of approximately 29 inches of mercury maintained therein by withdrawing vapors through the pipe 19. The heated materials were retained in the vacuum chamber 17 for approximately 20 minutes and then withdrawn and cooled to a temperature of approximately 190° F. in the coil 25. The cooled material was then filtered in the filter presses 28 and resulted in a clear light colored concentrate suitable for addition to shortenings or other cooking fats either to produce non-foaming high ratio shortenings or to produce non-foaming oils or fats having improved keeping qualities. Approximately 2.5 to 3% of this concentrate may be added to shortening to produce a non-foaming shortening having high ratio characteristics. Such high ratio shortenings are not limited in their utility to baking and deep fat frying, but may also be employed for any other purpose for which shortenings are used. In general, a much lesser amount of the concentrate need be added to secure high keeping qualities than for securing high ratio characteristics. Thus, as little as .1% to .2% of the concentrates above described will greatly improve keeping qualities, although more may be employed with no disadvantageous results except increase in cost. Also, irrespective of high ratio characteristics, a small amount of the concentrate added to margarine, for example .1 to 1% on the basis of the fat contained therein, improves its water retention properties and sufficient may be added to produce a product suitable for producing high ratio baked products.

As a specific example of destroying the foaming characteristics of phosphatidic materials during deodorization of the oil or fat, a 5000 lb. batch of shortening was treated in a deodorizer under vacuum and with superheated steam at a temperature of 385° F. to partially deodorize the same. A mixture of 100 lbs. of corn phosphatides (2% on the weight of oil) and 25 lbs. of "Nuchar" (0.5% on the weight of oil), 25 lbs. of dry powdered sodium chloride, and 200 lbs. of partially deodorized melted shortening was drawn as a stream into the body of the oil in the deodorizer. The sodium chloride was introduced to aid in subsequent filtering, and the melted shortening was to render the mixture easily flowable. The mixture introduced was at approximately 140° F. and foaming during the introduction of the mixture was not sufficient to cause any material amount of oil to be carried over into the vacuum system. The resulting mixture in the deodorizer was maintained under vacuum at 385° F. for 2 hours, during which time superheated steam was passed through the oil. The mixture was then cooled and filtered in the usual manner, no trouble being encountered due to blocking of the filter press. The resulting shortening was light in color, did not foam when heated to frying temperatures, and had excellent high ratio and keeping qualities.

The exact chemical modification which takes place when the mixture of oil or fat and phosphatidic material is heat treated as above described is as yet unknown to applicant. It is known that decomposition products are formed which must be removed from the material in order to produce a satisfactory high ratio shortening. It is further known that the phosphorus and nitrogen content of the phosphatides is reduced, and in some cases very little phosphorus remains in the resulting product, although an appreciable amount of nitrogen usually persists. From analytical data thus far obtained, it is believed that approximately one-half of the phosphatidic material originally added remains in the oil or fat as a modified material, the remainder being removed by filtering with an adsorbent. The material remaining in the oil or fat will be referred to in the claims as a modified phosphatidic material. Thus a shortening to which 4% of concentrate, made by treating a 50% mixture of fat and phosphatidic material, would contain approximately 1.3% of modified phosphatidic material.

Corn phosphatides and the sodium lactate-corn phosphatide composition was selected for purposes of the above description because of their light color and the excellent high ratio shortening produced. However, applicant has also found that satisfactory high ratio shortenings may be produced by employing other phosphatides such as cottonseed or even soy bean phosphatides alone or in the sodium lactate composition. Furthermore, many other edible phosphatidic compositions such as the sodium phosphate salts of phosphatides disclosed in my copending application Serial No. 290,083, filed August 14, 1939, and those disclosed in the copending continuation application thereof Serial No. 311,705, filed December 29, 1939, other phosphatidic compositions with edible water soluble hydroxy acids disclosed in my copending application Serial No. 311,707, filed December 29, 1939, as well as certain of the compounds of phosphatide with glycerine or sugars disclosed in copending application Serial No. 281,936, filed June 29, 1939, can be employed. Phosphatides or phosphatidic compositions free of linolenic acid such as the corn phosphatides are preferred in the present invention, as phosphatides or phosphatidic compositions having as their basis phosphatides containing linolenic acid radicals such as soya bean phosphatides, tend to darken to a greater extent upon heating and also may cause the oil or fat to revert in flavor to the flavor of the original soya bean oil. The compounds of soya bean phosphatides with alkali metal phosphates, or hydroxy acids, are, however, somewhat more stable than the soya bean phosphatides per se.

As an example of the use of the high ratio shortenings of the present invention, the following formulas illustrate cake batters having considerably more sugar than flour:

|  | Formula I | Formula II |
|---|---|---|
|  | Parts by weight | Parts by weight |
| Flour | 100 | 100 |
| Sugar | 133 | 140 |
| Shortening | 50 | 55 |
| Salt | 2.5 | 3.7 |
| Baking powder | 7.5 | 6.3 |
| Egg white | 75 | 75 |
| Milk | 104 | 95 |

It will be noted that the ratio of sugar to flour is considerably in excess of 1 in the above formulae. When the ingredients of these formulae employing the high ratio shortening of the present invention are well mixed in any desired manner in accordance with usual baking practice and baked at approximately 375° F., cakes of large volume, of substantially uniform depth, and of excellent texture and taste are produced. With usual shortenings containing no high ratio imparting ingredients, the resulting cakes are of small volume and poor texture.

I have employed the term "modified phosphatidic material" as definitive of the substance remaining in the oil or fat after heating to a temperature and for a time sufficient to destroy the foaming characteristics of the original phosphatidic material and filtering with an adsorbent, since no better term is known to me. It is, however, to be understood that this material differs radically from phosphatides in both its chemical and physical properties.

The term "fat" is employed in the claims to mean an oil which is either solid or liquid at ordinary temperatures, that is, the term "fat" is inclusive of either a solid or liquid fat.

While I have disclosed the preferred embodiments of my invention, it is understood that the details thereof may be varied within the scope of the following claims.

I claim:

1. The process of preparing a non-foaming glyceride fat having improved keeping qualities, which comprises, incorporating in a refined edible fat a modified phosphatidic material prepared by heating a phosphatidic material in the presence of a glyceride fat to a temperature and for a time sufficient to destroy the foaming characteristics but insufficient to destroy the protective action against rancidity of said phosphatidic material and filtering in the presence of an adsorbent.

2. The process of preparing a non-foaming glyceride fat having high keeping qualities, which comprises, adding a phosphatidic material to a refined edible glyceride fat and heating said mixture to a temperature and for a time sufficient to destroy the foaming characteristics but insufficient to destroy the protective action against rancidity of said phosphatidic material and filtering in the presence of an adsorbent.

3. The process of preparing a modified phosphatidic concentrate capable of being added to a refined edible glyceride fat without causing foaming of said fat during heating, which comprises, heating a glyceride fat containing a substantial amount of phosphatidic material to a temperature and for a time sufficient to destroy the foaming characteristics but insufficient to destroy the protective action against rancidity of said phosphatidic material, and filtering the same in the presence of an adsorbent.

4. The process of preparing a modified phosphatidic concentrate capable of being added to a glyceride fat without causing foaming of said fat during heating, which comprises, heating a mixture of glyceride fat and phosphatidic material in the presence of an adsorbent to a temperature and for a time sufficient to destroy the foaming characteristics but insufficient to destroy the protective action against rancidity of said phosphatidic material, promptly cooling said mixture, and filtering in the presence of an adsorbent.

5. The process of preparing a non-foaming high ratio shortening containing modified phosphatidic material, which comprises, adding a small amount of phosphatidic material to said shortening, heating the same to an elevated temperature for sufficient time to destroy the foaming characteristics but insufficient to destroy the high ratio properties of said phosphatidic material, and filtering the resulting shortening in the presence of an adsorbent.

6. The process of preparing a non-foaming high ratio shortening containing modified phosphatidic material, which comprises, adding a small amount of phosphatidic material to said shortening, heating the same in the presence of an adsorbent to a temperature and for a time sufficient to destroy the foaming characteristics but insufficient to destroy the high ratio properties of said phosphatidic material, and filtering the resulting mixture in the presence of an adsorbent.

7. The process of preparing a non-foaming high ratio shortening containing modified phosphatidic material, which comprises, adding a small amount of phosphatidic material to said shortening, heating the mixture to a temperature between 250 and 500° F. for sufficient time to destroy the foaming characteristics but insufficient to destroy the high ratio properties of said phosphatidic material, and filtering the resulting product in the presence of an adsorbent.

8. The process of preparing a non-foaming high ratio shortening containing modified phosphatidic material, which comprises, forming a modified phosphatidic concentrate by mixing phosphatidic material with a glyceride fat, heating the mixture to a temperature and for a time sufficient to destroy the foaming characteristics but insufficient to destroy the high ratio properties of said phosphatidic material, filtering the resulting mixture in the presence of an adsorbent to produce said concentrate, and adding a small amount of concentrate to shortening to form said non-foaming high ratio shortening.

9. The process of preparing a non-foaming high ratio shortening containing modified phosphatidic material, which comprises, forming a modified phosphatidic concentrate by mixing phosphatidic material with a glyceride fat, heating the mixture to a temperature and for a time sufficient to destroy the foaming characteristics but insufficient to destroy the high ratio properties of said phosphatidic material, filtering the resulting mixture in the presence of an adsorbent to produce said concentrate, adding a small amount of said concentrate to a shortening, and deodorizing the resulting shortening for a limited time to form said high ratio shortening.

BENJAMIN H. THURMAN.